June 12, 1962  B. J. EISENKRAFT  3,038,532
SPRAY PROCESS EQUIPMENT
Filed Jan. 12, 1960  2 Sheets-Sheet 2
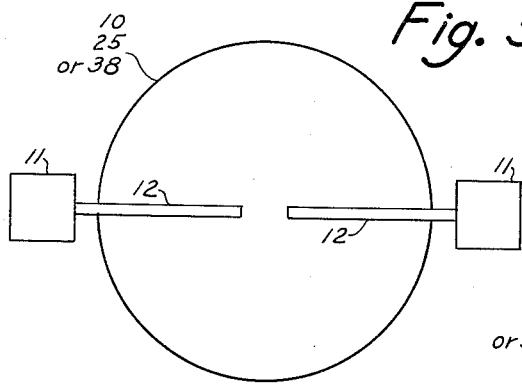
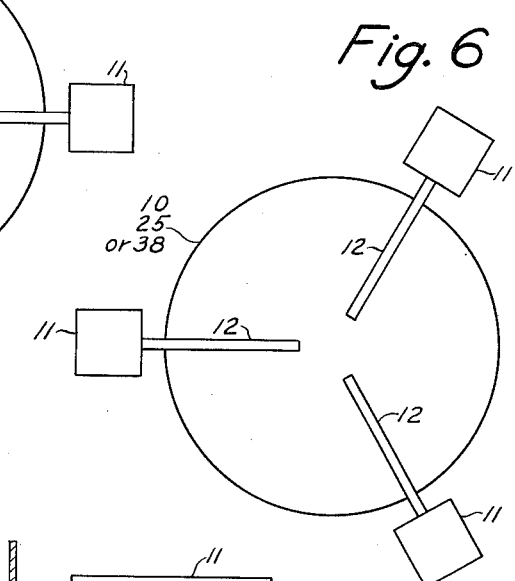
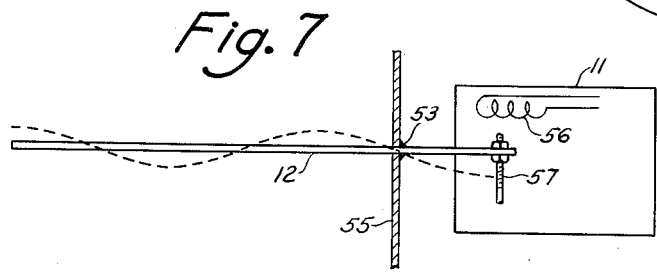
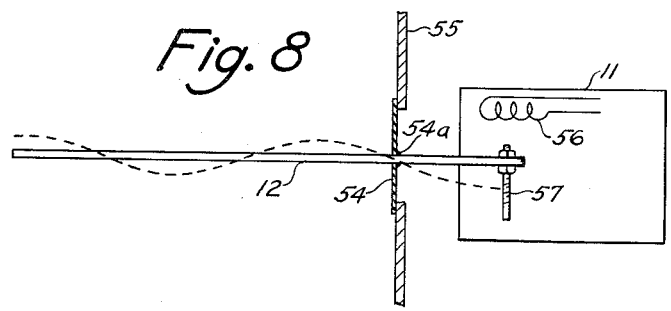
INVENTOR
*Bernard J. Eisenkraft*
BY *Jack Schuman*
ATTORNEY United States Patent Office  3,038,532
Patented June 12, 1962

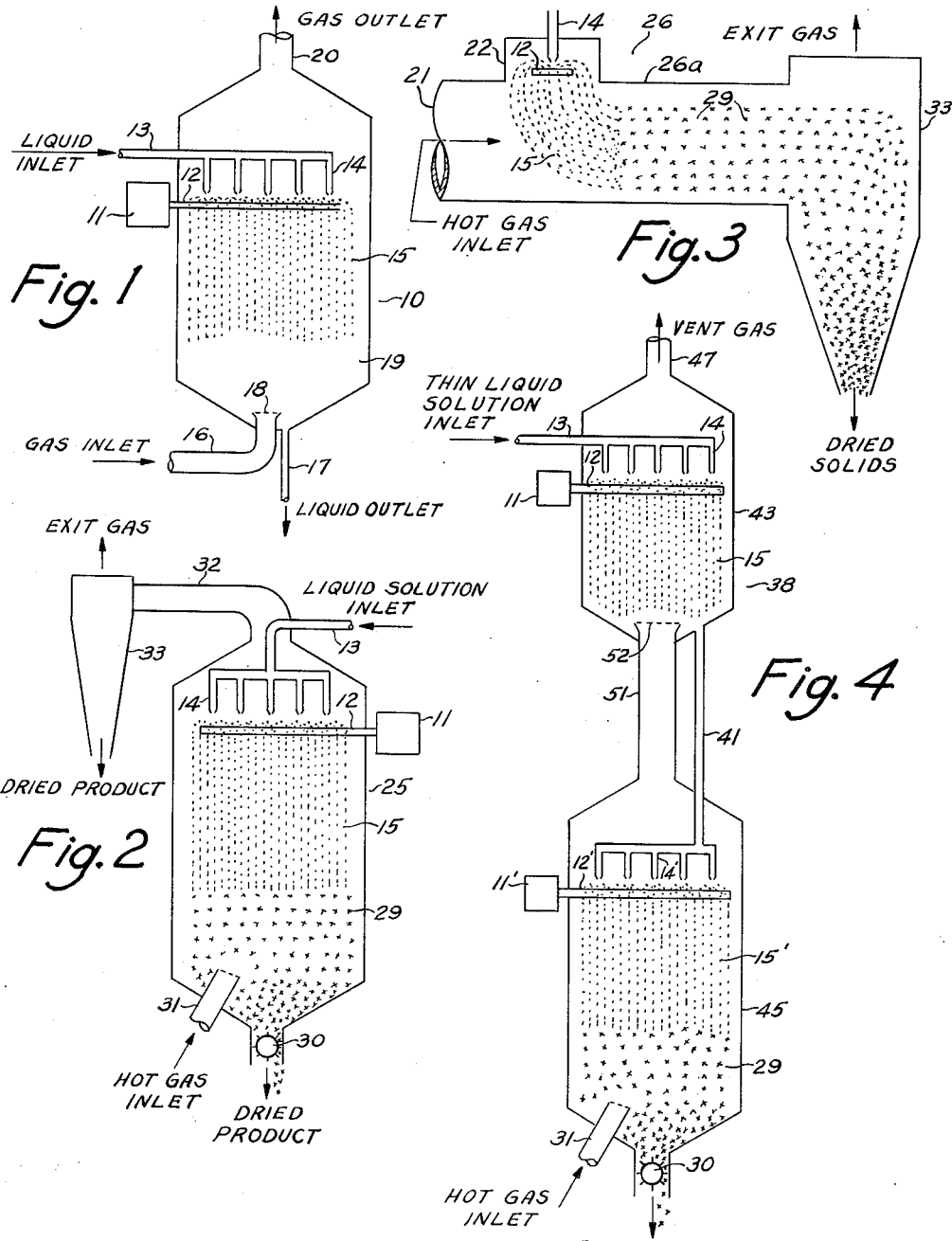

3,038,532
SPRAY PROCESS EQUIPMENT
Bernard J. Eisenkraft, 10564 Flatlands 10 St.,
Brooklyn, N.Y.
Filed Jan. 12, 1960, Ser. No. 1,887
1 Claim. (Cl. 159—4)

This invention relates to novel process equipment for heat and/or mass transfer between gas and liquid phases. These designs are based upon particular characteristics of the electromechanical atomizer disclosed in U.S. Pat. 2,779,623. Spray towers, in which a liquid spray contacts a gas stream, are of great use in the chemical process industries. The liquid or gas may be enriched with, or depleted of, materials transferable between the two phases depending in part upon the concentration gradient of the materials in each phase. Heat may also be transferred between the liquid and gas phases depending in part upon the temperature gradient between the two phases. If enough heat is transferred to a liquid spray solution, the solvent will evaporate from the droplets to leave dried particles. If enough heat is transferred from a liquid or molten spray, the droplets will freeze to solid particles. The huge surface area presented by the spray droplets promotes rapid heat and/or mass transfer between a liquid and gas phase. Also, various chemical reactions such as combustion are promoted efficiently in a spray chamber. The electromechanical atomizer can produce a longer spray droplet dwell time per foot of spray chamber height than conventional atomizers. Spray chambers utilizing the electromechanical atomizer can more closely approach the packed column or tray column in efficiency with simpler construction at lower cost. Other advantages of spray chambers using the electro mechanical atomizer are: the chamber height may be relatively small due to the low spray velocity down the chamber and good droplet size distribution, the spray chamber may be operated over a wider range of capacities, atomizer operating costs are low, and atomizer maintenance is low.

One of the objects of this invention is to provide a low cost and highly efficient spray chamber utilizing an electromechanical atomizer as the dispersing mechanism.

Another object of this invention is to provide a spray chamber of relatively small height made possible by the low spray velocity down the chamber due to the peculiar characteristics of the electromechanical atomizer.

Still another object of this invention is to provide a spray chamber which may be operated over a relatively wider range of capacities than has hitherto been possible with conventional spray chambers.

Other and further objects of this invention will become apparent during the course of the following description and by reference to the accompanying drawings in which like numerals represent like parts in the several views:

FIGURE 1 represents a diagrammatic view of a spray absorption column according to this invention.

FIGURE 2 represents a diagrammatic view of a countercurrent spray dryer tower built according to this invention.

FIGURE 3 represents a diagrammatic view of a concurrent or parallel flow pipeline spray dryer built according to this invention.

FIGURE 4 represents a diagrammatic view of a double effect spray dryer built according to this invention.

FIGURES 5 and 6 represent diagrammatic views in plan of this invention wherein, in columns of greater diameter, two or more electromechanical atomizers are extended into the column along different radii.

FIGURES 7 and 8 represent diagrammatic views in elevation of this invention, showing the bar-nozzle inoperative (in full lines) and vibrating (in phantom), and further showing two ways in which the openings in the process vessel may be sealed around the perimeter of the bar-nozzle.

Referring now to FIGURE 1, 10 is the spray absorption column. Its shape may be rectangular, circular, or otherwise depending upon the number and location of bar-nozzles incorporated in the chamber. In the preferred embodiment, electromechanical atomizer 11 with its bar-nozzle 12 is located near the top of absorption column 10 and extending therein and is operated as disclosed in U.S. Pat. 2,779,623. In other words, electromagnetic pickup or feed-back coil 56 is in electrical communication with the mechanism that operates drive rod 57 through a pre-amplifier, phase shifter and power amplifier as shown in FIG. 5 of my U.S. Patent 2,779,623. Inlet liquid enters distribution pipe 13 and flows through downcomer pipes 14 on to vibrating bar-nozzle 12. The liquid spray 15 arches off bar-nozzle 12 and descends by gravity through the rising gas stream to collect at bottom of chamber 10 and exit through discharge pipe 17. Gas enters inlet pipe 16 at sufficient velocity and passes through screened nozzle 18 to enter and fill column 10. The gas rises up column 10 contacting liquid spray 15. Heat and/or mass transfer occurs between the two phases depending in part upon the temperature and concentration gradients. The enriched or stripped gas passes up column 10 and out through gas discharge nozzle 20. The major portion of spray 15 occupies substantially the entire tower void space 19 below bar-nozzle 12.

Referring now to FIGURE 2, 25 is the spray dryer tower. Its shape may be rectangular, circular, or otherwise, depending upon the number and location of electromechanical atomizers incorporated in the chamber. The liquid feed system and atomizer device is the same as shown in FIGURE 1. Thus, the solution to be spray dried flows through downcomer pipes 14 on to vibrating bar-nozzle 12. The liquid solution spray 15 arches off bar-nozzle 12 and descends down spray dryer tower 25 in contact with rising hot drying gases. The hot gases entering spray dryer tower 25 through inlet nozzle 31, rise up tower 25 and mix with the liquid droplets 15, thus flashing off liquid solvent therefrom. The dried particles 29 fall to the bottom of tower 25 and are removed from tower 25 by rotary solids feeder 30. Rotary solids feeder 30 is a device well known in the art to remove solids from a chamber while maintaining a gas seal. Flashed vapor, drying gas, and some entrained dry solids from tower 25 through pipe 32, then into solids-gas separator or cyclone 33. Dried solids discharge from the bottom of cyclone 33 and gases vent from the top of cyclone 33. Such cyclones 33 are well known in the art and need no further description.

In spray dryers, the size of the drying chamber depends largely upon the spray pattern, droplet size distribution, and droplet velocity. The velocity of spray 15 is at a low terminal velocity within several inches of bar-nozzle 12. The droplet size distribution of spray 15 has been found to be quite narrow due to the resonance condition of bar-nozzle 12. Therefore, relatively smaller chambers may be used in comparison to the chambers used in present spray dryers of equivalent capacities. Erosive slurries would have little effect on bar-nozzle 12 for the velocity difference between the slurry and the bar-nozzle 12 is small.

The spray dryer chamber may be reduced to a large pipeline. In this case, space may be conserved in a building, spray dryer installation costs reduced, and process layout simplified. Referring now to FIGURE 3, 26 is a pipeline spray dryer comprising pipe 26a. Housing 22 is an enlargement of pipe 26a to contain the electromechanical atomizer. In the preferred embodiment, housing 22 is located near the hot gas inlet 21 to attain concurrent or parallel flow of the liquid spray and drying gases. Vibrating bar-nozzle 12 of an electromechanical atomizer described according to this invention extends into housing 22. Inlet liquid flows through downcomer pipes 14 on to a face of vibrating bar-nozzle 12. In the preferred embodiment, bar-nozzle 12 is mounted transverse to the axis of pipe 26a, although it may be mounted parallel thereto or at an angle thereto. Further, if pipe 26a is of sufficient size, housing 22 may be dispensed with; bar-nozzle 12 and downcomer pipe 14 will then extend directly into pipe 26a. Additionally, there may be several bar-nozzles 12 mounted in pipe 26a along the axis thereof, transverse thereto, or at angles thereto. The liquid spray 15 arches off bar-nozzle 12 and descends by gravity into pipe 26a where it is picked up by the fast moving hot drying gas from inlet 21. As the gas-borne droplets are conveyed along pipe 26a, liquid solvent is flashed off the droplets, leaving dried particles 29 suspended in the drying gas. The gas-solids mixture passes to cyclone 33 where solids are discharged from the bottom thereof, the drying gas and solvent vapor discharging from the top thereof.

The double effect spray dryer is a modification of this invention whereby it is possible to economically recover a major portion of the heat normally lost in vent gases from spray dryers. Theoretically, the evaporative capacity of a double effect spray dryer could be as much as 30% larger than that of a single effect spray dryer for the same heat energy consumption. This makes spray drying of solutions of low solids content feasible when single effect spray drying is ruled out as uneconomical. Referring now to FIGURE 4, 38 is a double effect spray dryer using hot gases to dry liquid solution droplets to the dry state. First effect column 43, an evaporative column, evaporates a portion of the solvent from the thin feed liquid by means of still hot gases vented from the second effect column 45. The thin liquid solution enters distribution pipe 13 and flows through downcomer pipes 14 on to vibrating bar-nozzle 12. The liquid spray 15 arches off bar-nozzle 12 and descends by gravity through the rising hot gas stream. Heat is absorbed from the hot gas stream by liquid spray 15 to evaporate a portion of the liquid solvent therefrom. The concentrated spray collects at the bottom of first effect column 43 and discharges through pipe 41. Pipe 41 feeds downcomer pipes 14' and the concentrated solution is fed therefrom to vibrating bar-nozzle 12' in second effect column 45. The concentrated liquid solution spray 15' arches off bar-nozzle 12' and descends down second effect column 45 in contact with rising hot gas. The droplet solvent is flashed off into vapor leaving dried particles 29 to fall to the bottom of second effect column 45. The dried particles 29 are removed from second effect column 45 by rotary solids feeder 30 to prevent escape of drying gases. Hot drying gas enters second effect column 45 through inlet pipe 31, rises up second effect column 45 to contact liquid spray 15', flashing off solvent liquor therefrom. The drying gas is cooled somewhat in the process yet still possesses drying capacity. The drying gases with solvent vapor and some entrained solids exit from second effect column 45 via pipe 51 and enter first effect column 43 through nozzle 52. Heat from the hot rising gases is transferred to liquid spray 15 in first effect column 43 to evaporate a portion of the liquid solvent from spray 15. Entrained solid particles redissolve into the liquid spray 15 and are largely recovered. The cooled drying gas with solvent vapor discharges from first effect column 43 through vent pipe 47.

The foregoing descriptions of the several pieces of apparatus comprising the invention relate not only to liquid solutions of various sorts but also to molten liquids.

Apparatus 10, 25, 26, and 38 have been shown as comprising only one electromechanical atomizer each. The invention can also comprise in a single chamber a plurality of electromechanical atomizers. In columns of moderate diameter (or analogous dimension) bar-nozzle 12 may extend substantially fully along said diameter (or analogous dimension). In columns of greater diameter, a plurality of bar-nozzles 12 can be extended into the column preferably equispaced along different radii as shown in FIGURES 5 and 6 and in the same or different planes. Further, apparatus 10, 25, 26, and 38 may be operated, as is known by those skilled in the art, under varying conditions of temperature and pressure.

Where bar-nozzle 12 extends into the several pieces of apparatus 10, 25, 26, and 38, it may be required to seal the opening in said apparatus receiving said bar-nozzle 12. FIGURE 7 shows one such method of sealing, which is particularly applicable where the wall of the apparatus is of light gauge material. Therein is shown a weld 53 around the perimeter of bar-nozzle 12. Obviously, said weld is at a nodal point on said bar-nozzle 12. Another method of sealing is shown in FIGURE 8 as comprising a rubber-like sheet 54 secured to the wall 55 of the particular piece of process equipment and cemented, or similarly secured, about the perimeter of bar-nozzle 12. Where the slit 54a is tight enough about bar-nozzle 12, the cementing can be dispensed with.

Electromagnetic pickup or feed-back coil 56 (corresponding to item 45 of U.S. Pat. 2,779,623) may be positioned and suitably supported within the process vessel. However, it is preferred to mount this pickup 56 outside the process vessel, at a position relative to bar-nozzle 12 opposite drive rod 57 (corresponding to item 32 in U.S. Pat. 2,779,623). Such position, obviously, is at an anti-nodal point on said bar-nozzle 12. It will be recalled, from the teaching of said U.S. Pat. 2,779,623, that bar-nozzle 12 may be of magnetic material, or at the anti-nodal point adjacent to the pickup coil, a magnetic member (not shown) may be secured to bar-nozzle 12. It will also be recalled, from the teachings of said prior patent, that pickup coil 56 is placed just beyond the maximum amplitude of said bar-nozzle 12 at said anti-nodal point.

While the preferred embodiments of this invention have been shown, it shall be understood that the invention is not limited to these preferred embodiments, but may include substitutions, modifications, or equivalents as described in the specification or as pointed out in the claim.

What is claimed is:

Atomizing apparatus comprising:
(1) a shell,
(2) an atomizing chamber enclosed within said shell,
(3) a substantially flat, elongated, horizontally disposed vibrating bar extending through said shell and having
 (a) a first end outside said atomizing chamber, and
 (b) a second end inside said atomizing chamber,
(4) said shell engaging said bar completely around the periphery thereof at a nodal position with respect to the vibrations of said bar,
(5) said first and second ends of said bar being antinodes with respect to the vibrations of said bar,
(6) that portion of said bar extending into said atomizing chamber between said shell and said second end of said bar having a plurality of antinodes with respect to the vibrations of said bar,
(7) electromechanical vibrating means outside said atomizing chamber to maintain said bar vibrating at a resonant flexural mode comprising
 (a) electromechanical drive means secured to the first end of said bar,
 (b) electromagnetic pickup means adjacent said first end of said bar opposite said electromechanical drive means beyond the maximum amplitude of vibration of said bar at said first end, an in operative electrical communication with said electromechanical drive means, (8) feed means to introduce liquid to be atomized to the upper face of said bar within said atomizing chamber at a plurality of antinodes between said shell and said second end of said bar, (9) said bar being effective along its length within said atomizing chamber between said shell and said second end of said bar to atomize said liquid.

References Cited in the file of this patent

UNITED STATES PATENTS

| | | |
|---|---|---|
| 1,166,225 | Krause | Dec. 28, 1915 |
| 1,697,814 | Forbes | Jan. 1, 1929 |
| 1,758,745 | Jones | May 13, 1930 |
| 1,779,516 | Stevenson et al. | Oct. 28, 1930 |
| 1,797,055 | Douthitt | Mar. 17, 1931 |
| 2,289,753 | Capstaff | July 14, 1942 |
| 2,361,940 | Hall | Nov. 7, 1944 |
| 2,413,420 | Stephanoff | Dec. 31, 1946 |
| 2,453,595 | Rosenthal | Nov. 9, 1948 |
| 2,457,091 | Schlesman | Dec. 21, 1948 |
| 2,636,555 | Klepetko et al. | Apr. 28, 1953 |
| 2,779,623 | Eisenkraft | Jan. 29, 1957 |
| 2,803,370 | Lennard | Aug. 20, 1957 |
| 2,838,135 | Pilo et al. | June 10, 1958 |
| 2,839,122 | Laguilharre | June 17, 1958 |
| 2,907,707 | Wintermute | Oct. 6, 1959 |
| 2,924,271 | Conley et al. | Feb. 9, 1960 |

FOREIGN PATENTS

| | | |
|---|---|---|
| 758,128 | Great Britain | Sept. 26, 1956 |